United States Patent
Anthony et al.

(10) Patent No.: US 7,864,978 B2
(45) Date of Patent: Jan. 4, 2011

(54) SMART ARRANGEMENT AND CROPPING FOR PHOTO VIEWS

(75) Inventors: Colin R. Anthony, Bothell, WA (US); Martijn E. Van Tilburg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1151 days.

(21) Appl. No.: 11/347,405

(22) Filed: Feb. 6, 2006

(65) Prior Publication Data

US 2007/0186154 A1 Aug. 9, 2007

(51) Int. Cl.
 *G06K 9/00* (2006.01)
(52) U.S. Cl. .......... 382/100; 345/788; 715/712
(58) Field of Classification Search .......... 382/100; 715/712
 See application file for complete search history.

(56) References Cited

U.S. PATENT DOCUMENTS

| | | | | |
|---|---|---|---|---|
| 6,977,665 B2* | 12/2005 | Yokouchi | ...... | 345/629 |
| 7,051,291 B2* | 5/2006 | Sciammarella et al. | ...... | 715/838 |
| 7,600,191 B2* | 10/2009 | Yoshikawa et al. | ...... | 715/790 |
| 7,636,089 B2* | 12/2009 | Anthony et al. | ...... | 345/419 |
| 2002/0030634 A1* | 3/2002 | Noda et al. | ...... | 345/5 |
| 2002/0122067 A1* | 9/2002 | Geigel et al. | ...... | 345/788 |
| 2002/0135621 A1* | 9/2002 | Angiulo et al. | ...... | 345/838 |
| 2003/0095720 A1* | 5/2003 | Chiu et al. | ...... | 382/284 |
| 2004/0032599 A1* | 2/2004 | Atkins et al. | ...... | 358/1.9 |
| 2004/0150657 A1* | 8/2004 | Wittenburg et al. | ...... | 345/619 |
| 2005/0007382 A1* | 1/2005 | Schowtka | ...... | 345/619 |
| 2005/0010868 A1* | 1/2005 | Schowtka et al. | ...... | 715/517 |
| 2006/0048076 A1* | 3/2006 | Vronay et al. | ...... | 715/850 |

OTHER PUBLICATIONS

Dynamic Layout management—Board, Hyunmo et al., IEEE, 0-7695-1644-0, 2002, pp. 1-3.*

* cited by examiner

*Primary Examiner*—Samir A. Ahmed
*Assistant Examiner*—Jayesh Patel
(74) *Attorney, Agent, or Firm*—Lee & Hayes, PLC

(57) ABSTRACT

A random yet smart selection of layouts is provided when viewing a set of photos. A set of layouts may be chosen such that a reasonable sense of variety and uniqueness is provided when viewing the photos. For instance, photos may be randomly assigned to one of a plurality of groups, where each group may have its own layout type and its own number of photos. An iterative algorithm may be applied to determine which photos are assigned to which groups. In addition, smart cropping of photo thumbnails may be provided to fit frames provided in the various presented layouts. The amount and/or type of cropping provided may depend upon the aspect ratios of both the thumbnail and the frame in which the thumbnail is to be placed.

19 Claims, 4 Drawing Sheets

P = 15 photos → P = 10 photos → P = 7 photos → P = 1 photo → empty
5-photo view      3-photo view      6-photo view     1-photo view
K01               K02               K03              K04
Fig. 6
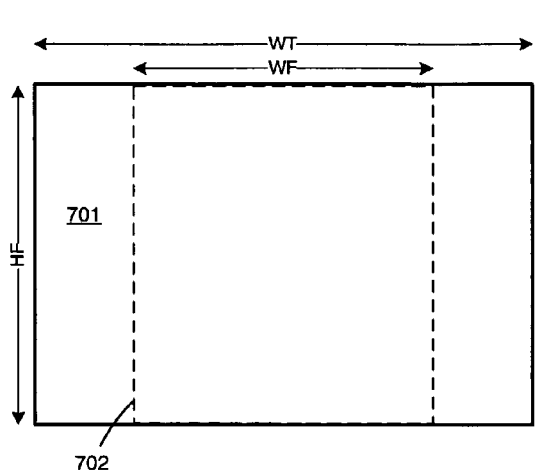
Fig. 7
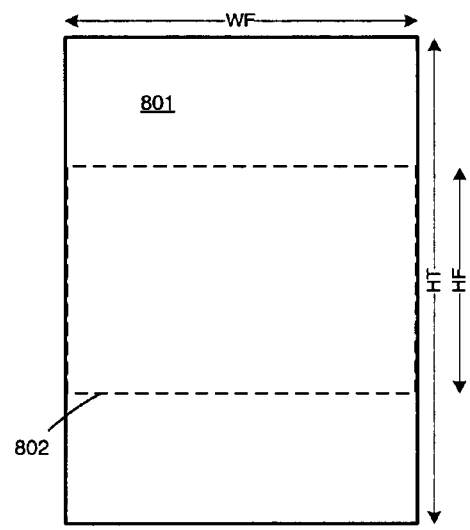
Fig. 8
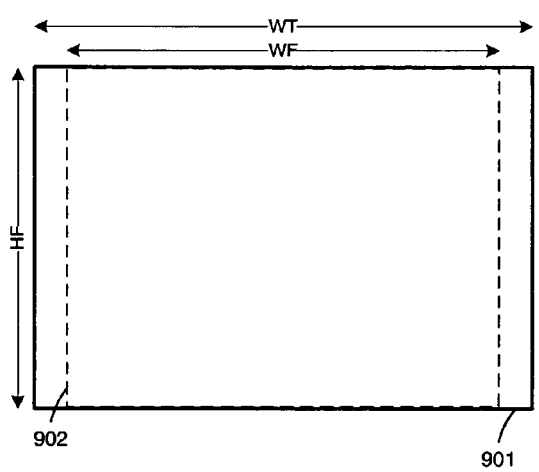
Fig. 9
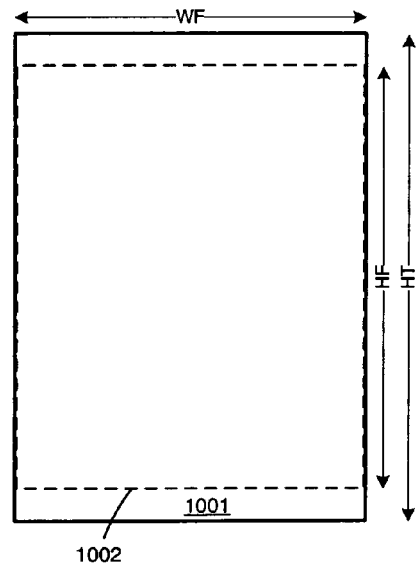
Fig. 10

SMART ARRANGEMENT AND CROPPING FOR PHOTO VIEWS

BACKGROUND

With the growing popularity of digital cameras, photos are more commonly stored electronically on computers instead of physically on paper. User interfaces have been developed to allow a user to manage and view his or her photos electronically. As part of these user interfaces, the user sometimes has the option of viewing photos as smaller, thumbnail versions. In addition, the user is sometimes presented with the option of choosing a particular layout in which the photo thumbnails are arranged for viewing. For instance, a user may view a tiled layout where the thumbnails are arranged in rows and columns, or as a stacked view.

Whichever layout is chosen, it is necessary to arrange the photos such that they are able to be properly presented in that layout. The particular arrangement may need to take into account the number of photos to be viewed, the sizes of the photos, and their aspect ratios.

SUMMARY

Aspects of the present invention are directed to providing a random, yet smart, selection of layouts when viewing a set of photos. A set of layouts may be chosen such that a reasonable sense of variety and uniqueness is provided when viewing the photos. For instance, photos may be randomly assigned to one of a plurality of groups, where each group may have its own layout type and its own number of photos. An iterative algorithm may be applied to determine which photos are assigned to which groups.

Further aspects of the present invention are directed to smart cropping of photo thumbnails to fit frames provided in the various presented layouts. The amount and/or type of cropping provided may depend upon the aspect ratios of both the thumbnail and the frame in which the thumbnail is to be placed.

These and other aspects of the disclosure will be apparent upon consideration of the following detailed description of illustrative embodiments.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention.

FIG. 6 illustrates the remaining photo population and number of photos chosen during various steps of FIG. 5.

FIG. 7 shows illustrative cropping of a landscape photo in a portrait frame.

FIG. 8 shows illustrative cropping of a portrait photo in a landscape frame.

FIG. 9 shows illustrative cropping of a landscape photo in a landscape frame.

FIG. 10 shows illustrative cropping of a portrait photo in a portrait frame.

DETAILED DESCRIPTION OF ILLUSTRATIVE EMBODIMENTS

Illustrative Computing Environment

Figure 1:
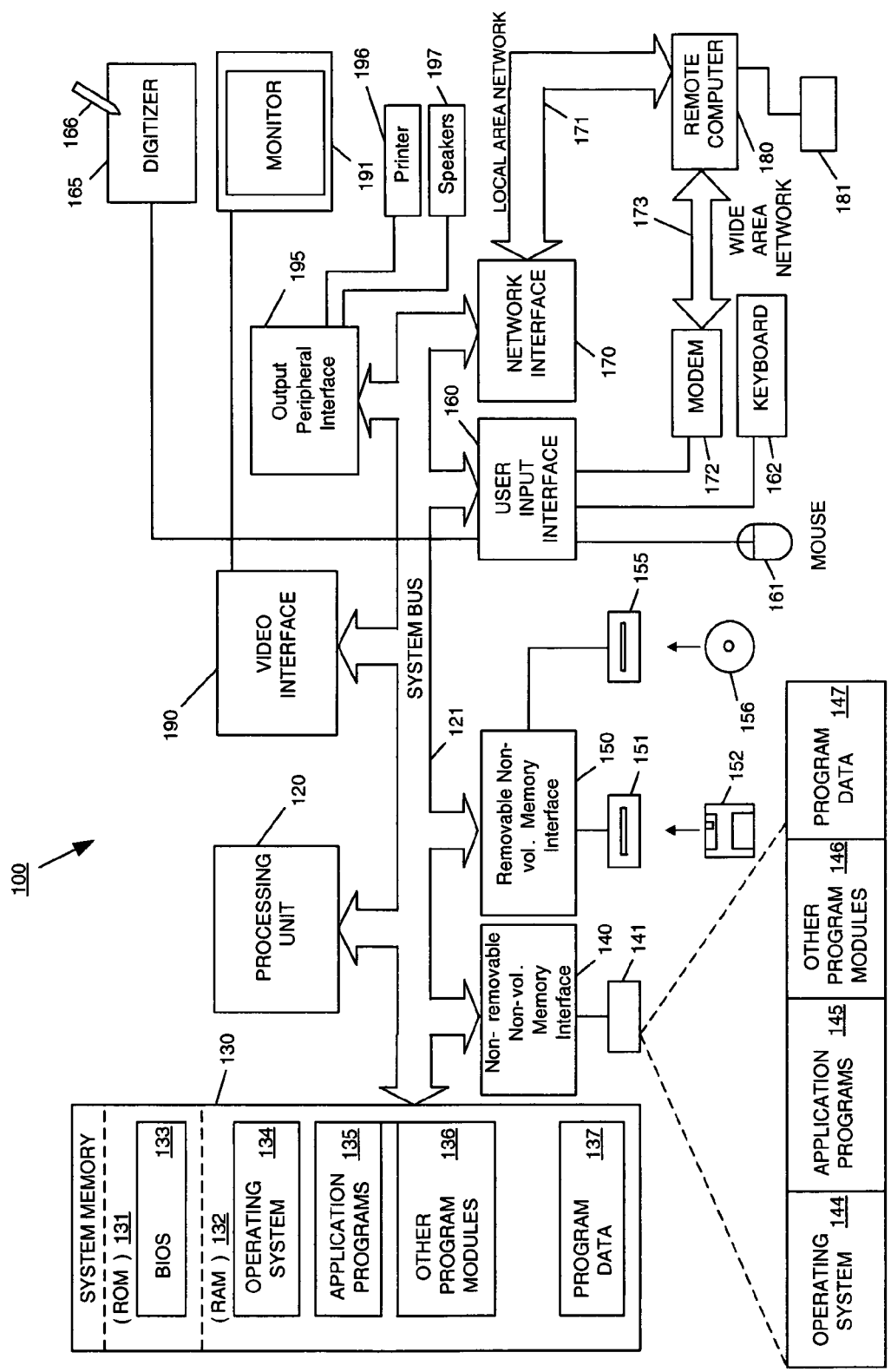
FIG. 1 is a functional block diagram of an illustrative computing environment.

FIG. 1 illustrates an example of a suitable computing system environment 100 in which aspects as described herein may be implemented. Computing system environment 100 is only one example of a suitable computing environment and is not intended to suggest any limitation as to the scope of use or functionality of various aspects as described herein. Neither should computing system environment 100 be interpreted as having any dependency or requirement relating to any one or combination of components illustrated in illustrative computing system environment 100.

One or more other general purpose or special purpose computing system environments or configurations may be used. Examples of well known computing systems, environments, and/or configurations that may be suitable include, but are not limited to, personal computers (PCs); server computers; hand-held and other portable devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the disclosure herein may be described in the general context of computer-executable instructions, such as program modules, stored on one or more computer-readable media and executable by a computer. Generally, program modules include routines, programs, objects, components, data structures, etc. that perform particular tasks or implement particular abstract data types. Embodiments discussed herein may also be operational with distributed computing environments where tasks are performed by remote processing devices that are linked through a communications network. In a distributed computing environment, program modules may be located in both local and remote computer-readable media including memory storage devices.

With reference to FIG. 1, illustrative computing system environment 100 includes a general purpose computing device in the form of a computer 100. Components of computer 100 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 100 typically includes a variety of computer-readable media. Computer readable media can be any available media that can be accessed by computer 100 such as volatile, nonvolatile, removable, and non-removable media. By way of example, and not limitation, computer-readable media may include computer-readable media and communication media. Computer-readable media are tangible media, and may include volatile, nonvolatile, removable, and non-removable media implemented in any method or technology for storage of information such as computer-readable instructions, data structures, program modules or other data. For example, computer-readable media includes random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium which can be used to store the desired information and which can accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., BLUETOOTH, WiFi, UWB), optical (e.g., infrared) and other wireless media. Any single computer-readable medium, as well as any combination of multiple computer-readable media, are both intended to be included within the scope of the term "computer-readable medium" as described and claimed herein.

System memory 130 includes computer-readable storage media in the form of volatile and/or nonvolatile memory such as ROM 131 and RAM 132. A basic input/output system (BIOS) 133, containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions, including operating system 134, application programs 135, other program modules 136, and program data 137.

Computer 100 may also include other computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 100. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 100 through input devices such as a keyboard 162 and a pointing device 161, commonly referred to as a mouse, trackball or touch pad. Such pointing devices may provide pressure information, providing not only a location of input, but also the pressure exerted while clicking or touching the device. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). A monitor 191 or other type of display device is also coupled to system bus 121 via an interface, such as a video interface 190. Video interface 190 may have advanced 2D or 3D graphics capabilities in addition to its own specialized processor and memory.

Computer 100 may also include a touch-sensitive device 165, such as a digitizer, to allow a user to provide input using a stylus 166. Touch-sensitive device 165 may either be integrated into monitor 191 or another display device, or be part of a separate device, such as a digitizer pad. Computer 100 may also include other peripheral output devices such as speakers 197 and a printer 196, which may be connected through an output peripheral interface 195.

Computer 100 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices, enterprise-wide computer networks, intranets and the Internet.

When used in a LAN networking environment, computer 100 is coupled to LAN 171 through a network interface or adapter 170. When used in a WAN networking environment, computer 100 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 100, or portions thereof, may be stored remotely such as in remote storage device 181. By way of example, and not limitation, FIG. 1 illustrates remote application programs 182 as residing on memory device 181. It will be appreciated that the network connections shown are illustrative, and other means of establishing a communications link between the computers may be used.

As discussed previously, touch-sensitive device 165 may be a device separate from or part of and integrated with computer 100. In addition, any or all of the features, subsystems, and functions discussed in connection with FIG. 1 may be included in, coupled to, or embodied integrally as part of, a tablet computer. For example, computer 100 may be configured as a tablet computer or a handheld device such as a PDA where touch-sensitive device 165 would be considered the main user interface. In such a configuration touch-sensitive device 165 may be considered to include computer 100. Tablet computers are well-known. Tablet computers interpret gestures input to touch-sensitive device 165 using stylus 166 in order to manipulate data, enter text, create drawings, and/or execute conventional computer application tasks such as spreadsheets, word processing programs, and the like. Input may not only be made by stylus 166, but also by other types of styli such as a human finger.

Electronic File System

An electronic file system may be implemented by computer 100 to manage photos and other objects stored in the various electronic media to which computer 100 has access. The file system may be part of the other program modules 136, such as a software application, and/or part of operating system 134. Using the electronic file system, the user may interact with the objects via, for instance, a graphical user interface. The graphical user interface may cause various visual features to be displayed on a display such as monitor 191. For example, the graphical user interface may include displayed representations of each object, or of a subset of the objects, stored by the electronic file system. A representation may be any visual representation such as an icon or a picture. For example, where the object is a photo, a representation of the photo may be a thumbnail of the photo itself, or a graphical icon.

The graphical user interface may also respond to user input. The user input may be received via any user input device such as mouse 161, digitizer 165 and stylus 166, and/or keyboard 162. In response to such user input, computer 100 interprets the input and determines an appropriate action, which may include adjusting what is displayed in the graphical user interface. For example, where a representation is selected by the user, computer 100 may cause the graphical user interface to visually indicate on monitor 191 that the representation has been selected.

Photo Layouts

The user may also choose to view a selected set of representations, such as photo representations. For instance, the user may open a folder of photos and wish to see the set of representations associated with those photos. Or, the user may perform a search for particular photos and wish to view the search results as a set of photo representations. Where a set of photo representations are to be viewed, they may be arranged in the graphical user interface in accordance with a selected view. The view may define any one or more aspects of how the representations are presented on the graphical user interface. For example, without listing herein every possibility, the view may define how many representations are displayed simultaneously, how representations may be grouped together and/or how many representations may be in each group, whether the representations are shown as two-dimensional representations (e.g., a simple thumbnail) or three-dimensional representations (e.g., a thumbnail photo shown at an angle), and/or the sizes of the representations.

Figure 2:
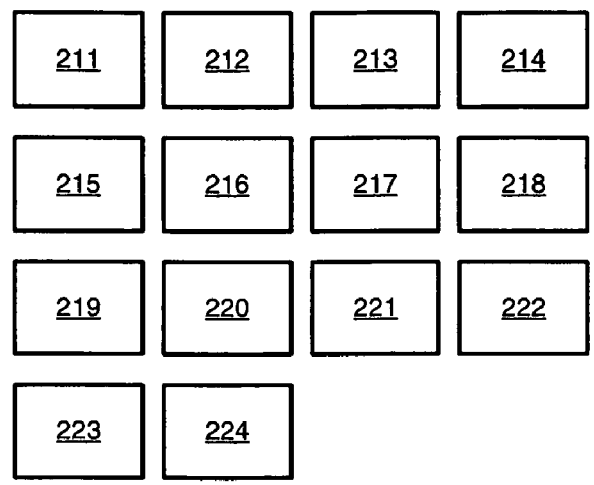
FIG. 2 is an illustrative screenshot of a tiled layout of a set of photo representations.

It will therefore be understood that many types of views may be provided, and that the particular views described herein are merely illustrative. Referring to FIG. 2, for example, a typical population of fourteen photos is shown represented in a tiled view by representations 211-224. This is a conventional view of photos that is currently implemented by several operating systems such as the line of Microsoft WINDOWS brand operating systems.

Figure 3:
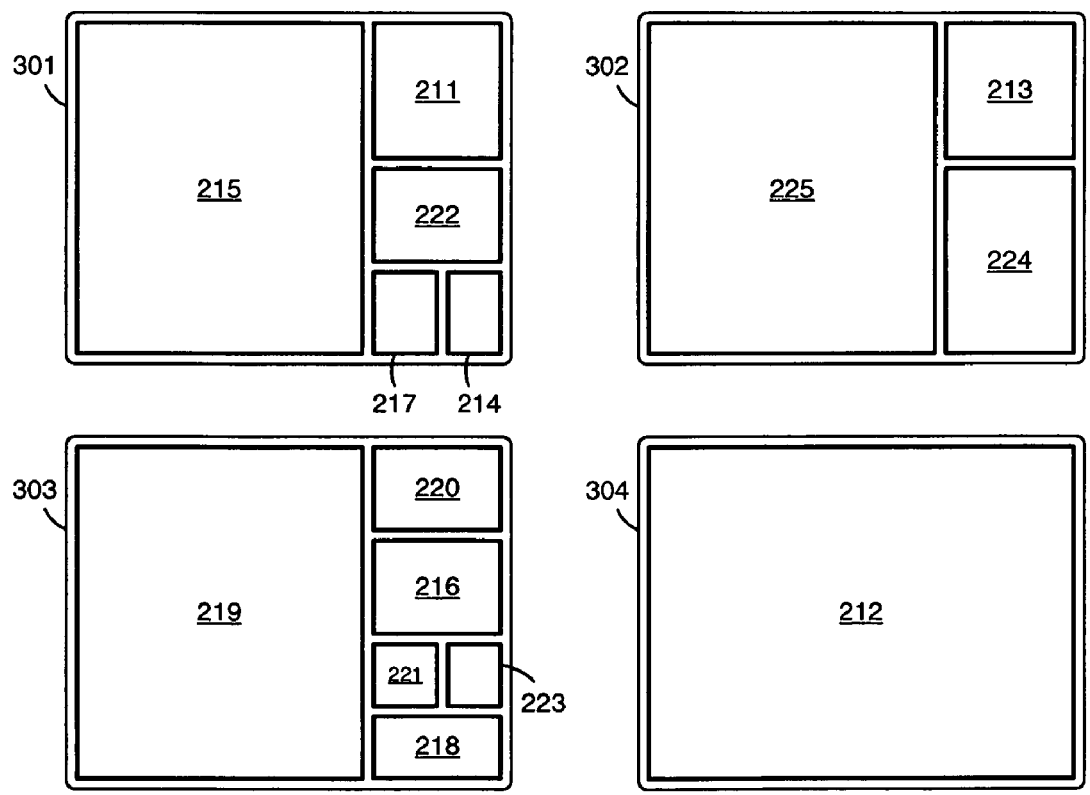
FIG. 3 is an illustrative screenshot of various layout groups of a set of photo representations.

Another example of a view is what will be referred to herein as the magazine view or layout. The magazine view may be considered a subset of a tiled view. In the magazine view, photo representations are arranged in one or more groups such that each representation is displayed as a two-dimensional thumbnail version of the photo with which it is associated. At least some of the representations are of different sizes relative to each other. One of the representations in each group may be larger than all of the others in that group such that the larger photo appears to the user as the main photo and the remaining photos appears to the user a supporting photos. The photo that is the main photo in a magazine view may be randomly chosen or may be chosen based on photo metadata, user preferences, and/or other factors. Referring to FIG. 3, an example of a magazine view having five photo representations 211, 214, 215, 217, and 222 is shown as a group 301. In this example, representation 215 is the largest in group 301, representations 211 and 222 are of medium size, representation 217 is of a smaller size, and representation 214 is of the smallest size in group 301. Other groups 302, 303, 304 are also shown, each with their own sets of photo representations laid out in like manner. Magazine groups may have different numbers of photos therein. Notably, group 304 has only a single photo, indicated by representation 212.

Figure 4:
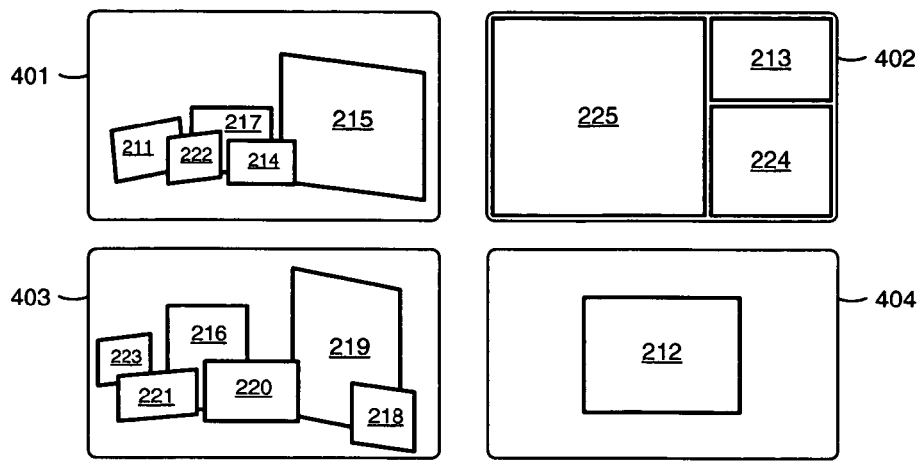
FIG. 4 is another illustrative screenshot of various layout groups of a set of photo representations.

Another example of a view is what is referred to herein as a mantel view, or mantel layout. The mantel view shows thumbnail representations of photos in a three-dimensional manner as though the thumbnails were photographs leaning up against a wall, such as on a fireplace mantel. An example of this is shown in FIG. 4, which shows for mantel view groups 401, 402, 403, 404. Group 401, for instance, contains five representations 211, 214, 217, 215, and 222. Some of the representations overlap, such as representation 222 overlapping representations 211 and 217, to give a layered three-dimensional appearance. Also, some or all of the representations are shown at an angle, as can be seen in FIG. 4.

Automated Photo Layouts

The user may also decide to view photos in a more natural way that involves an aspect of randomness to the presentation of the photos. In this way, a set of photo groupings and layouts may be chosen automatically that provide a reasonable sense of variety and uniqueness to the photos. The way that photos are presented to the user may be random and/or be based on one or more factors such as user settings, the number of photos to be viewed, and/or other factors.

An example of how a set of photos may be presented is illustrated in FIG. 3. Here, photo representations 211-24 are grouped into four groups 301, 302, 303, 304. Each of groups 301-304 are shown as magazine views, and each contains a different number of photos. Group 301, for instance, contains five photos, represented by photo representations 211, 214, 215, 217, and 222. Photos (or photo representations) are grouped where they are arranged on the display such that they appear as a group separated from adjacent photos (or photo representations) that are not in the group by a distance that is larger than a distance between adjacent photos (or photo representations) within the group. For instance, the photos in group 301 are closer to each other than to the photos in any of the other groups of FIG. 3. Additionally, each group may have a visible border around the group and/or some other displayed feature that visually separates photos in a group from photos outside the group. For instance, in FIG. 3, a box is drawn around each group 301-304, making it clear to the user how the groups are defined.

Each group of photos may have a particular layout, which may be the same for each group or different for some or all of the groups. For instance, groups 301-304 each have a magazine layout. Although for simplicity in this example all groups 301-304 have the same layout, they may have layouts different from each other. In addition, it can be seen from FIG. 3 that each group has a different number of photos contained therein. The number of photos in each group may be randomly chosen or may be chosen in accordance with a set pattern or sequence. In addition, the number of photos in a given group may depend upon the layout for that group. More particularly, each layout may have a different maximum number of photos that may be assigned to a group. For example, the magazine view may have an associated maximum of seven photos. This means that a magazine view group may have one, two, three, four, five six, or seven photos in that single group. By automatically mixing layout types and/or the number of photos in each displayed group, a more natural and interesting photo presentation may be achieved.

An example of an iterative algorithm for determining groupings such as in FIG. 3 will be discussed with reference to FIGS. 5 and 6. In step 501, the user, a software application, or the operating system selects a set of photos to be viewed or previewed. In the present disclosure, the number (or population) of photos selected will be referred to as P. Selection of the set of P photos may be performed using any known or future selection tools available. For example, a user may select a pre-defined folder of photos, or a user may define a query that results in a set of photos meeting the query criteria, or a user may use a graphical lasso tool to select a set of photo representations (e.g., thumbnails or icons) associated with a set of photos.

Regardless of how the set of photos are selected, in response to the selection, computer 100 in this example automatically chooses a particular layout from a plurality of different possible layouts in step 502. For example, a magazine view or a mantel view may be chosen. The particular layout chosen in step 502 may be chosen, for example, in accordance in accordance with a pre-selected order, in accordance with user preferences, and/or randomly. As previously mentioned, each layout type may have associated with it a maximum number of photos that may be grouped together. For instance, the magazine view may allow up to seven photos to be grouped together in any single group, whereas the mantel view may allow up to five photos to be grouped together in any single group. These numbers are merely illustrative, and any other maximums may be used. In the present disclosure, the maximum number associated with a chosen view will be referred to as N.

Next, in step 503, a number n that is greater than or equal to one and less than or equal to both N and P may be chosen. For example, where N is seven and P is forty, n may be chosen to be a value between one and N, inclusive. Or where N is seven and P is five, n may be chosen to be a value between one and P, inclusive. In the example of FIG. 6, P is fifteen and n is chosen to be five.

Next, in step 504, n (in this case, five) of the P photos are chosen, such as randomly or in a specified order. These n photos may then be displayed to the user as a group of n photos in accordance with the view selected in step 502. Thus, as referred to in FIG. 6, a five-photo magazine view grouping (in this example, group 201) is displayed. Because these five photos 211, 214, 215, 217, 222 have already been selected for grouping together, these five photos are removed from the population P of the originally selected photos, and so in step 505, P is now reduced by n. In this example, P now equals 10.

Next, in step 506, it is tested whether P equals zero. If so, then the process is ended as all of the original selected photos have been grouped and displayed to the user. However, if P is not equal to zero, then the set of steps 502-506 are repeated until P equals zero. In the example of FIG. 6, n is chosen, in sequence, to be equal to five, then three, then six, and then one, resulting in remaining groups 302, 303, 304, in this example. Also, in the example of FIG. 3, all of the groups 301-304 are chosen to be the same, that is, the magazine view. However, in step 502, the view may be selected to be different for one or more of the groups. For example, referring to FIG. 4, groups 401, 403, and 404 are each a magazine view, and group 402 is a mantel view.

Figure 5:
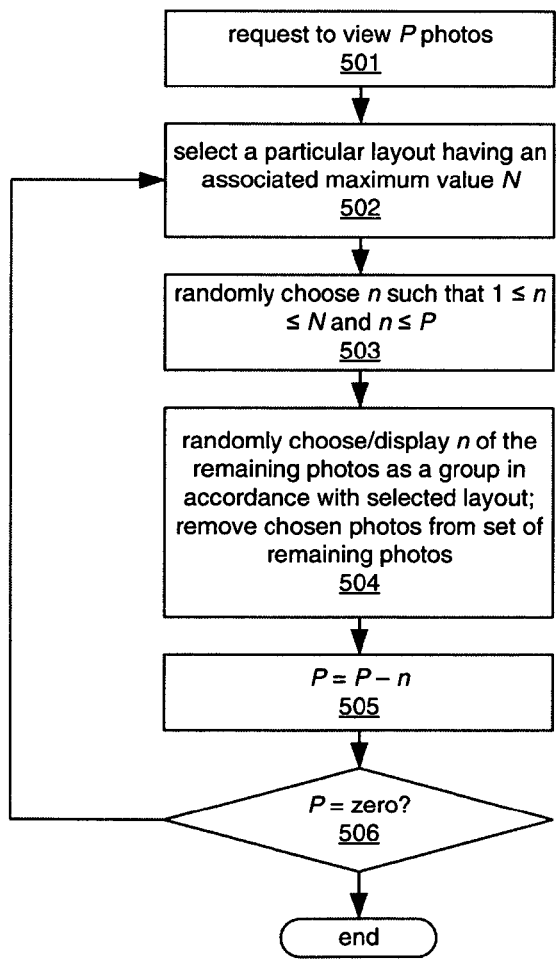
FIG. 5 is an illustrative flowchart showing steps that may be performed in determining and displaying various layout groups of a set of photo representations.

Although the steps are shown in FIG. 5 in a particular order and as discrete sequential steps, some or all of the steps may be performed in a different order, simultaneously, combined together, or further subdivided. For example, one or more layouts may be chosen prior to step 501, as opposed to being chosen in step 502 in response to step 501. Or, for instance, all of the various values of n may be chosen prior to choosing which photos to place in each group. In addition, although steps 502-506 are shown as being performed responsive to an explicit request to view photos, they may be performed in other circumstances. For example, where a set of photos is already being viewed, and the set is modified (e.g., a photo is added or removed), then some or all of the steps of FIG. 5 may be performed in response to the modification in order to update the view of the photo set.

It is further noted that the request to view photos may be a request to view the photos statically or as a dynamic slideshow. In the first instance, each group 301-304 may be displayed to the user simultaneously. In the latter instance, each group 301-304 may be displayed one at a time to the user. Also, in the latter instance, a single group may be displayed to the user, wherein instead of replacing the entire group with the next sequential group, the photo representations in the existing group are removed and replaced with the next subset of photo representations for the next group. This may be done using animation such as by fading and/or panning into the next subset of photo representations.

Thumbnail Cropping Within a Layout

Each photo representation (e.g., photo representation 215) may be a miniaturized version (i.e., thumbnail) of the photo it represents. In addition, each photo representation may have a particular frame having a particular aspect ratio. The frame may be defined by the layout for the group in which that photo resides. For example, photo representation 215 has a frame (i.e., boundary) that has a particular height (up/down direction of FIG. 3) and a particular width (left/right direction of FIG. 3) that may be defined by the magazine view for group 301. A thumbnail photo may be cropped in an intelligent way on one or more sides so as to fit into its frame without distortion and yet completely fill the frame with the thumbnail. FIGS. 7-10 show four situations where a thumbnail is cropped. In general, the smaller dimension of a thumbnail will be adjusted to match the corresponding dimension of its frame, without changing the aspect ratio of the thumbnail (the aspect ratio of the thumbnail may equal the aspect ratio of the original photo that is being represented).

Referring to FIG. 7, a thumbnail photo 701 is shown in comparison with a frame 702 into which the thumbnail is to be placed. Thumbnail 701 is a landscape photo; it has a width that is greater than its height. Frame 702 is a portrait frame; it has a height HF that is greater than its width WF. In this example, thumbnail 701 is sized without changing its fixed aspect ratio such that its height is equal to HF (since the height of thumbnail 701 is the smaller dimension of thumbnail 701). This means in this example that a portion of thumbnail 701 has a width WT greater than WF such that thumbnail 701 will extend out from frame 702 on the left and/or right sides. In this case, thumbnail 701 may be centered in frame 702 in the left/right direction, such that thumbnail 701 extends out from frame 702 in both the left and right directions. However, thumbnail 701 may be positioned in any of a variety of ways other than centering, such as left-aligned, right-aligned, or anything in between. Regardless of the positioning within frame 702, the portion(s) of thumbnail 701 not within frame 702 are cropped and/or otherwise not displayed to the user.

As another example, FIG. 8 shows a portrait thumbnail 801 in comparison with a landscape frame 802. In this example, thumbnail 801 is sized without changing its fixed aspect ratio such that its width is equal to WF (since the width of thumbnail 801 is the smaller dimension of thumbnail 801). This means in this example that a portion of thumbnail 801 has a height HT greater than HF such that thumbnail 801 will extend out from frame 802 on the top and/or bottom sides. In this case, thumbnail 801 may be centered in frame 802 in the up/down direction, such that thumbnail 801 extends out from frame 802 at both the top and bottom. However, thumbnail 801 may be positioned in any of a variety of ways other than centering, such as top-aligned, bottom-aligned, or anything in between. Regardless of the positioning within frame 802, the portion(s) of thumbnail 801 not within frame 802 are cropped and/or otherwise not displayed to the user.

As yet another example, FIG. 9 shows a landscape thumbnail 901 in comparison with a landscape frame 902. In this example, thumbnail 901 is sized without changing its fixed aspect ratio such that its height is equal to HF (since the height of thumbnail 901 is the smaller dimension of thumbnail 901). This means in this example that a portion of thumbnail 901 has a width WT greater than WT such that thumbnail 901 will extend out from frame 902 on the left and/or right sides. In this case, thumbnail 901 may be centered in frame 902 in the left/right direction, such that thumbnail 901 extends out from frame 902 at both the left and right sides. However, thumbnail 901 may be positioned in any of a variety of ways other than centering, such as left-aligned, right-aligned, or anything in between. Regardless of the positioning within frame 902, the portion(s) of thumbnail 901 not within frame 902 are cropped and/or otherwise not displayed to the user.

As another example, FIG. 10 shows a portrait thumbnail 1001 in comparison with a portrait frame 1002. In this example, thumbnail 1001 is sized without changing its fixed aspect ratio such that its width is equal to WF (since the width of thumbnail 1001 is the smaller dimension of thumbnail 1001). This means in this example that a portion of thumbnail 1001 has a height HT greater than HF such that thumbnail 1001 will extend out from frame 1002 on the top and/or bottom. In this case, thumbnail 1001 may be centered in frame 1002 in the up/down direction, such that thumbnail 1001 extends out from frame 1002 at both the top and bottom. However, thumbnail 1001 may be positioned in any of a variety of ways other than centering, such as top-aligned, bottom-aligned, or anything in between. Regardless of the positioning within frame 1002, the portion(s) of thumbnail 1001 not within frame 1002 are cropped and/or otherwise not displayed to the user.

CONCLUSION

Thus, an improved way of presenting photos or other graphically-presented objects in a computing system has been disclosed. For instance, by presenting the photos in a varied mix of layouts with different numbers of photos divided into various groups, the user may be presented with a more natural and interesting user interface that may look different each time the photos are viewed.

In discussing the above features, all actions involved, such as but not limited to, receiving user input, responding to user input, selecting, choosing, assigning, defining, calculating, displaying, storing information, and making decisions, may be performed by the user and/or by computer 100 as instructed by software embodied as computer-executable instructions. The computer-executable instructions may be stored on a computer-readable medium such as RAM 132, ROM 131, and/or disk 156. The software may be part of operating system 134, one or more application programs 135, and/or one or more other program modules 136.

What is claimed is:

1. A computer-readable storage device storing computer-executable instructions for performing acts, the acts comprising:
    selecting a plurality of P photos, wherein P is a modifiable non-negative integer variable initially equal to the number of selected photos and greater than zero;
    selecting a layout from a plurality of layouts, the layout being a selected layout configured to accommodate from one to a maximum of N photos, wherein the plurality of layouts includes a mantel layout and a magazine layout;
    assigning a random number of each of the photos to one of a plurality of groups of the selected layout, such that no greater than the lesser of P or N photos are assigned to each assigned group, wherein a value of N depends upon the selected layout; and
    displaying each of the assigned groups as a separate group of representations of the photos assigned to each group.

2. The computer-readable storage device of claim 1, wherein the representations are each a thumbnail version of the photo being represented.

3. The computer-readable storage device of claim 1, wherein assigning includes:
    randomly choosing a number n1 that is greater than zero and less than or equal to the lesser of P or N;
    first choosing n1 of the photos;
    when n1 is greater than zero:
        defining a first one of the groups based at least in part on n1;
        assigning the n1 photos to the first group;
        decrementing P by n1, wherein when P is decremented to a value less than zero, P equals zero;
        when P is greater than zero:
            randomly choosing a random number n2 that is greater than zero and less than or equal to the lesser of P or N;
            choosing n2 of the photos not chosen in the first choosing, wherein n2 is less than or equal to N;
            when n2 is greater than zero:
                decrementing P by n2, wherein when P is decremented to a value less than zero, P equals zero;
                defining a second one of the groups based at least in part on n2; and
                assigning the n2 photos to the second group.

4. The computer-readable storage device of claim 1, wherein assigning includes:
    randomly choosing a number n1 that is greater than zero and less than or equal to the lesser of P or N;
    first choosing n1 of the photos;
    defining a first one of the groups based at least in part on n1;
    assigning the n1 photos to the first group;
    decrementing P by n1; and
    determining whether any of the photos have not yet been chosen in the first choosing, and in response to determining that at least some of the photos have not yet been chosen in the first choosing, performing the following acts:
  randomly choosing a number n2 that is greater than zero and less than or equal to the lesser of P or N;
  choosing n2 of the photos not chosen in the step of first choosing;
  defining a second one of the first plurality of groups based at least in part on n2; and
  assigning the n2 photos to the second group.

5. The computer-readable storage device of claim 1, wherein the plurality of layouts further includes a two-dimensional layout and a three-dimensional layout, and
  when the selected layout is the two-dimensional layout, then the photos are displayed in each group in a two-dimensional representation, and
  when the selected layout is the three-dimensional layout, then the photos are displayed in each group in a three-dimensional representation.

6. The computer-readable storage device of claim 1, wherein the selected layout defines how the photo representations associated with the photos assigned thereto are arranged within each group in the displaying.

7. The computer-readable storage device of claim 1, wherein the representations are thumbnails, and wherein for each of at least some of the thumbnails, determining a frame size for the thumbnail and resizing and cropping the thumbnail to fit within the frame size such that the thumbnail fully fits within the frame size in one direction.

8. A computer-readable storage device storing computer-executable instructions for performing acts, the acts comprising:
  selecting a plurality of photos, wherein P is a modifiable non-negative integer variable initially equal to the number of selected photos and greater than zero;
  selecting a first layout from a plurality of layouts, the first layout configured to accommodate from one to a maximum of N photos;
  assigning a random number of each of a first subset of the photos to one of a first plurality of groups, such that no greater than N photos are assigned to each of the first plurality of groups, wherein a value of the maximum number depends upon which of the plurality of layouts is selected as the first layout;
  selecting a second layout from the plurality of layouts, different from the first layout, the second layout configured to accommodate from one to a maximum of M photos;
  assigning a random number of each of a second subset of the photos, different from the first subset, to one of a second plurality of groups, such that no greater than M photos are assigned to each of the second plurality of groups, wherein a value of M depends upon which of the plurality of layouts is selected as the second layout, and wherein M is not equal to N; and
  displaying each of the first and second groups as a separate cluster of representations of the photos assigned to each group.

9. The computer-readable storage device of claim 8, wherein assigning a random number of each of a first subset of the photos to one of a first plurality of groups includes:
  randomly choosing a number n1 that is greater than zero and less than or equal to the lesser of P or N;
  first choosing n1 of the photos;
  defining a first one of the first plurality of groups based at least in part on n1;
  assigning the n1 photos to the first one of the first plurality of groups;
  decrementing P by n1;
  randomly choosing a number n2 that is greater than zero and less than or equal to the lesser of P or N;
  second choosing n2 of the photos not chosen in the first choosing;
  defining a second one of the first plurality of groups based at least in part on n2;
  decrementing P by n2; and
  assigning the n2 photos to the second one of the first plurality of groups.

10. The computer-readable storage device of claim 9, wherein assigning a random number of each of a second subset of the photos, different from the first subset, to one of a second plurality of groups includes:
  randomly choosing a number m1 that is greater than zero and less than or equal to the lesser of P or M;
  third choosing m1 of the photos not chosen in either of the first and second choosing;
  defining a first one of the second plurality of groups based at least in part on m1;
  assigning the m1 photos to the first one of the second plurality of groups;
  decrementing P by m1;
  randomly choosing a number m2 that is greater than zero and less than or equal to the lesser of P or M;
  fourth choosing m2 of the photos not chosen in any of the first, second, and third choosing;
  defining a second one of the second plurality of groups based at least in part on m2; and
  assigning the m2 photos to the second one of the second plurality of groups.

11. The computer-readable storage device of claim 8, wherein assigning a random number of each of a first subset of the photos to one of a first plurality of groups includes:
  randomly choosing a number n1 that is greater than zero and less than or equal to the lesser of P or N;
  first choosing n1 of the photos;
  defining a first one of the first plurality of groups based at least in part on n1;
  assigning the n1 photos to the first one of the first plurality of groups;
  decrementing P by n1; and
  determining whether any of the photos have not yet been chosen in the first choosing, and in response to determining that at least some of the photos have not yet been chosen in the first choosing, performing the following acts:
    randomly choosing a number n2 that is greater than zero and less than or equal to the lesser of P or N;
    second choosing n2 of the photos not chosen in the first choosing;
    defining a second one of the first plurality of groups based at least in part on n2;
    decrementing P by n2; and
    assigning the n2 photos to the second one of the first plurality of groups.

12. The computer-readable storage device of claim 11, wherein assigning further includes:
  determining whether any of the photos have not yet been chosen in either of the first and second choosing, and in response to determining that at least some of the photos have not yet been chosen in either of the first and second choosing, performing the following acts:
    randomly choosing a number m1 that is greater than zero and less than or equal to the lesser of P or M;

third choosing a random number m1 of the photos;

defining a first one of the second plurality of groups based at least in part on m1; and assigning the m1 photos to the first one of the second plurality of groups.

13. A computer-readable storage device storing computer-executable instructions for performing acts, the acts comprising:

selecting a plurality of P photos, wherein P is a modifiable non-negative integer variable initially equal to the number of selected photos and greater than zero;

in response to selecting the plurality of P photos, selecting a first layout from a plurality of layouts, the first layout configured to accommodate from one to a maximum of N photos and the plurality of layouts includes a mantel layout and a magazine layout;

assigning a first subset of the plurality of photos to a first group having the first layout, wherein a quantity of the first subset of photos is selected based on which of the plurality of layouts is the first layout and the quantity of the first subset of photos is a random integer between 1 and N;

selecting a second layout from the plurality of layouts, the second layout configured to accommodate from one to a maximum of M photos;

assigning a second subset of the plurality of photos, different from the first subset, to a second group having the second layout, wherein a quantity of the second subset of photos is selected based on which of the plurality of layouts is the second layout and the quantity of the second subset of photos is a random integer between 1 and M; and displaying each of the first and second groups as a separate group of representations of the photos assigned to each group, wherein the first group is displayed in accordance with the first layout and the second group is displayed in accordance with the second layout.

14. The computer-readable storage device of claim 13, wherein the selecting the first layout includes randomly selecting the first layout from a set of the plurality of layouts and the selecting the second layout includes randomly selecting the second layout from a set of the plurality of layouts.

15. The computer-readable storage device of claim 13, wherein the first and second layouts each defines how the photo representations associated with the photos assigned thereto are arranged within each group in the displaying.

16. The computer-readable storage device of claim 13, wherein the representations are thumbnails, and wherein the acts further include, for each of at least some of the thumbnails of the first group, determining a frame size for the thumbnail and resizing and cropping the thumbnail to fit within the frame size such that the thumbnail fully fits within the frame size in one direction.

17. The computer-readable storage device of claim 16, wherein the frame size for a given one of the thumbnails of the first group depends upon which of the plurality of layouts is the first layout.

18. The computer-readable storage device of claim 13, wherein one of the first and second layouts is a two-dimensional layout and the other of the first and second layouts is a three-dimensional layout.

19. The computer-readable storage device of claim 13, wherein the assigning the first subset of photos includes selecting random ones of the photos to be part of the first subset.

* * * * *